United States Patent
Daerr et al.

(10) Patent No.: US 11,152,129 B2
(45) Date of Patent: Oct. 19, 2021

(54) LOW PROFILE ANTI SCATTER AND ANTI CHARGE SHARING GRID FOR PHOTON COUNTING COMPUTED TOMOGRAPHY

(71) Applicant: KONINKLIJKE PHILIPS N.V., Eindhoven (NL)

(72) Inventors: Heiner Daerr, Hamburg (DE); Roland Proksa, New Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/637,876

(22) PCT Filed: Aug. 14, 2018

(86) PCT No.: PCT/EP2018/072018
§ 371 (c)(1),
(2) Date: Feb. 10, 2020

(87) PCT Pub. No.: WO2019/034650
PCT Pub. Date: Feb. 21, 2019

(65) Prior Publication Data
US 2020/0251236 A1 Aug. 6, 2020

(30) Foreign Application Priority Data
Aug. 14, 2017 (EP) .................................. 17186194

(51) Int. Cl.
*G21K 1/02* (2006.01)
*G01N 23/046* (2018.01)
(Continued)

(52) U.S. Cl.
CPC .......... *G21K 1/025* (2013.01); *G01N 23/046* (2013.01); *G01T 1/2006* (2013.01); *G01T 1/244* (2013.01)

(58) Field of Classification Search
CPC .... G21K 1/025; G01N 23/046; G01T 1/2006; G01T 1/244
See application file for complete search history.

(56) References Cited

U.S. PATENT DOCUMENTS 4,875,227 A * 10/1989 Rossi ...................... G01T 1/362
378/154
2003/0227996 A1* 12/2003 Francke ................. A61B 6/482
378/5

(Continued)

FOREIGN PATENT DOCUMENTS

WO   WO2018095983 A1   5/2018

OTHER PUBLICATIONS

PCT International Search Report, International application No. PCT/EP2018/072018, dated Nov. 29, 2018.

*Primary Examiner* — Blake C Riddick
(74) *Attorney, Agent, or Firm* — Larry Liberchuk

(57) ABSTRACT

An anti-scatter grid (ASG) for X-ray imaging with a surface (S) formed from a plurality of strips (LAM). The plurality of strips including at least two guard strips ($L_i, L_{i+1}$) that are thicker in a direction parallel to said surface than one or more strips ($l_i$) of said plurality of strips (LAM). The one or more strips ($l_i$) being situated in between said two guard strips ($L_i, L_{i+1}$).

15 Claims, 4 Drawing Sheets

(51) Int. Cl.
    *G01T 1/20* (2006.01)
    *G01T 1/24* (2006.01)

(56) References Cited

U.S. PATENT DOCUMENTS

| | | |
|---|---|---|
| 2004/0228447 A1 | 11/2004 | Dobbs |
| 2005/0111627 A1 | 5/2005 | Leppert |
| 2005/0123099 A1 | 6/2005 | Schneider |
| 2007/0076850 A1 | 4/2007 | Souchay |
| 2008/0175347 A1* | 7/2008 | Tkaczyk .................. G01T 1/24 378/7 |
| 2009/0008564 A1* | 1/2009 | Balan .................... G01T 1/1644 250/366 |
| 2009/0225938 A1 | 9/2009 | Zeitler |
| 2010/0187429 A1* | 7/2010 | Engel .................... G01T 1/2928 250/370.09 |
| 2010/0204942 A1* | 8/2010 | Danielsson ............ G01T 1/243 702/85 |
| 2011/0099790 A1 | 5/2011 | Tonami |
| 2011/0164727 A1 | 7/2011 | Tonami |
| 2013/0168567 A1 | 7/2013 | Wartski |
| 2016/0206255 A1* | 7/2016 | Gagnon ............... A61B 6/4275 |
| 2017/0265833 A1* | 9/2017 | Danielsson ............ A61B 6/032 |
| 2018/0259657 A1* | 9/2018 | Fu ........................... G01T 7/005 |
| 2018/0317869 A1* | 11/2018 | Rui ......................... A61B 6/06 |
| 2018/0321395 A1* | 11/2018 | Steadman Booker .. G01T 1/244 |
| 2018/0356541 A1* | 12/2018 | Steadman Booker .. G01T 1/243 |
| 2019/0008474 A1* | 1/2019 | Sjolin .................. A61B 6/4241 |
| 2019/0378631 A1* | 12/2019 | Thran .................... G21K 1/025 |
| 2020/0158895 A1* | 5/2020 | Danielsson ............ A61B 6/032 |
| 2020/0268330 A1* | 8/2020 | Altunbas ............. A61B 6/4216 |

\* cited by examiner

LOW PROFILE ANTI SCATTER AND ANTI CHARGE SHARING GRID FOR PHOTON COUNTING COMPUTED TOMOGRAPHY

FIELD OF THE INVENTION

The invention relates to an anti-scatter-grid, an imaging module, and an imaging apparatus.

BACKGROUND OF THE INVENTION

Some X-ray imaging apparatuses, such as computed tomography (CT) scanners or others, use energy discriminating detector equipment. Unlike more traditional detectors that are merely energy integrating, energy discriminating detector systems are capable to analyze the energy spectrum of the X-radiation. This additional information extraction allows for instance spectral imaging to learn about the material composition of the imaged sample.

One type of such energy discriminating detector systems are direct conversion photon counting detectors. These use largely unstructured semiconductors for conversion of X-radiation into detector signals. Structuring or "pixilation" is achieved by arranging a plurality of electrodes on the semiconductor. The electrodes register photon events that are caused by charge clouds formed within the semiconductors due to impacting photons. The electrodes provide the detector signals in form of electrical pulses that can be processed into spectral image data.

An undesirable phenomenon of "charge sharing" may occur in these type of detector or similar event counters. "Charge sharing" is an effect where the very same photon event is registered by more than one of the electrodes and this may disturb the energy discrimination capability of the imaging apparatus.

One way of reducing the influence of charge sharing is to use algorithms that analyze the detected signals of different pixels. In case of a charge sharing event many pulses with a small pulse height are detected at the same instance of time in adjacent pixels. The pulse heights can be combined to recover the initial pulse height.

SUMMARY OF THE INVENTION

There may be a need for alternative ways to improve event counting based imaging.

The object of the present invention is solved by the subject matter of the independent claims where further embodiments are incorporated in the dependent claims. It should be noted that the following described aspects equally apply to the imaging module, and to the imaging apparatus.

According to a first aspect of the invention there is provided an anti-scatter grid (ASG) for X-ray imaging with a surface formed from a plurality of strips, said plurality of strips including at least two guard strips that are thicker in a direction parallel to said surface than one or more strips of said plurality of strips, said one or more strips being situated in between said two guard strips.

According to one embodiment, the at least two guard strips are formed from a foil.

According to one embodiment, the said foil is metallic. Specifically and according to one embodiment, said foil includes any one or a combination of: Molybdenum or Lead, or Tungsten. Using foil is cost effective and allows for a particularly low-profile built, with a total height of the ASG of about 1 mm-4 mm. The same aspect ratio can be achieved with a lower profile as compared to traditional ASGs that have a height about 10 times higher for the same aspect ratio.

According to one embodiment, the ASG has an aspect ratio of about 10 to 40.

According to one embodiment, a thickness of at least one said at least two guard strips is about 20 µm to 200 µm.

According to one embodiment, a thickness of at least one of said one or more strips is about 5 µm to 50 µm.

According to a second aspect there is provided an imaging module, comprising an X-ray detector with at least one detector pixel and an ASG as described above, wherein a distance between said at least two guard strips corresponds to an average charge cloud diameter or an average spread of light photons formable in said detector (XD). The average charge cloud is formed in a conversion layer of a direct conversion type detector whilst the spread of light photons is formed in s scintillator layer of an indirect type detector.

According to one embodiment, the at least one of the at least two guard strips is positioned between two detector pixels, so as to reduce a likelihood for detection of an X-radiation event by both of said two detector pixels. An X-radiation event is for instance a charge cloud formed due to X-radiation impact.

According to one embodiment, the said size of said at least one pixel is between 50 µm and 1 mm.

According to a third aspect there is provided an imaging apparatus, comprising an anti-scatter grid as described above or an imaging module as described above.

According to one embodiment, the imaging apparatus or the imaging module comprises an event counter.

According to one embodiment, the event counter is configured to support spectral imaging.

According to one embodiment, the imaging apparatus is a computed tomography scanner.

In other words, what is proposed herein is an ASG with anti-charge sharing capability. The newly proposed ASG has hence a dual function: it reduces scatter but, in addition, it also acts against charge sharing. The ASG is particularly beneficial when used in photon counting detector systems with relatively small pixels (about 100 µm-500 µm). The ASG is preferably low-profile, with a height of about 1 mm-4 mm. The ASG may have a one-dimensional strip pattern. However, 2D arrangements are also envisaged, where there are two sets of strips, where strips from different sets are non-parallel, in particular perpendicular.

In the module, the ASG is so aligned with the detector, such that the thicker, guard strips are in registry with inter-spaces between the pixels of the detector. This prevents in particular direct (unscattered) X-ray photons from reaching the critical "charge sharing zone" in a conversion layer of the detector. These zones are spatial portions within the body of the conversion layer that are situated (when viewed in plan view) between said electrode interspaces.

According to a fourth aspect there is provided a method to support manufacture of an anti-scatter grid of a detector, the scatter grid to include strips of two different thicknesses, the method comprising:

determining an average charge cloud diameter or an average light photon spread for said detector; and based on the diameter, dimensioning a thickness a thicker one of said strips.

The detector is either of the direct conversion type where the charge cloud is formed in the conversion layer or the detector is of the indirect conversion type where light photons are generated at a certain spread in the scintillator layer in response to X-ray.

The spatial quantifiers "proximal"/distal" and "top"/"bottom", etc are used herein with relation to the location of the X-ray source of the imaging apparatus, into which the ASG is mountable.

BRIEF DESCRIPTION OF THE DRAWINGS

Exemplary embodiments of the invention will now be described with reference to the following drawings (which are not to scale) wherein.

DETAILED DESCRIPTION OF EMBODIMENTS

Figure 1:
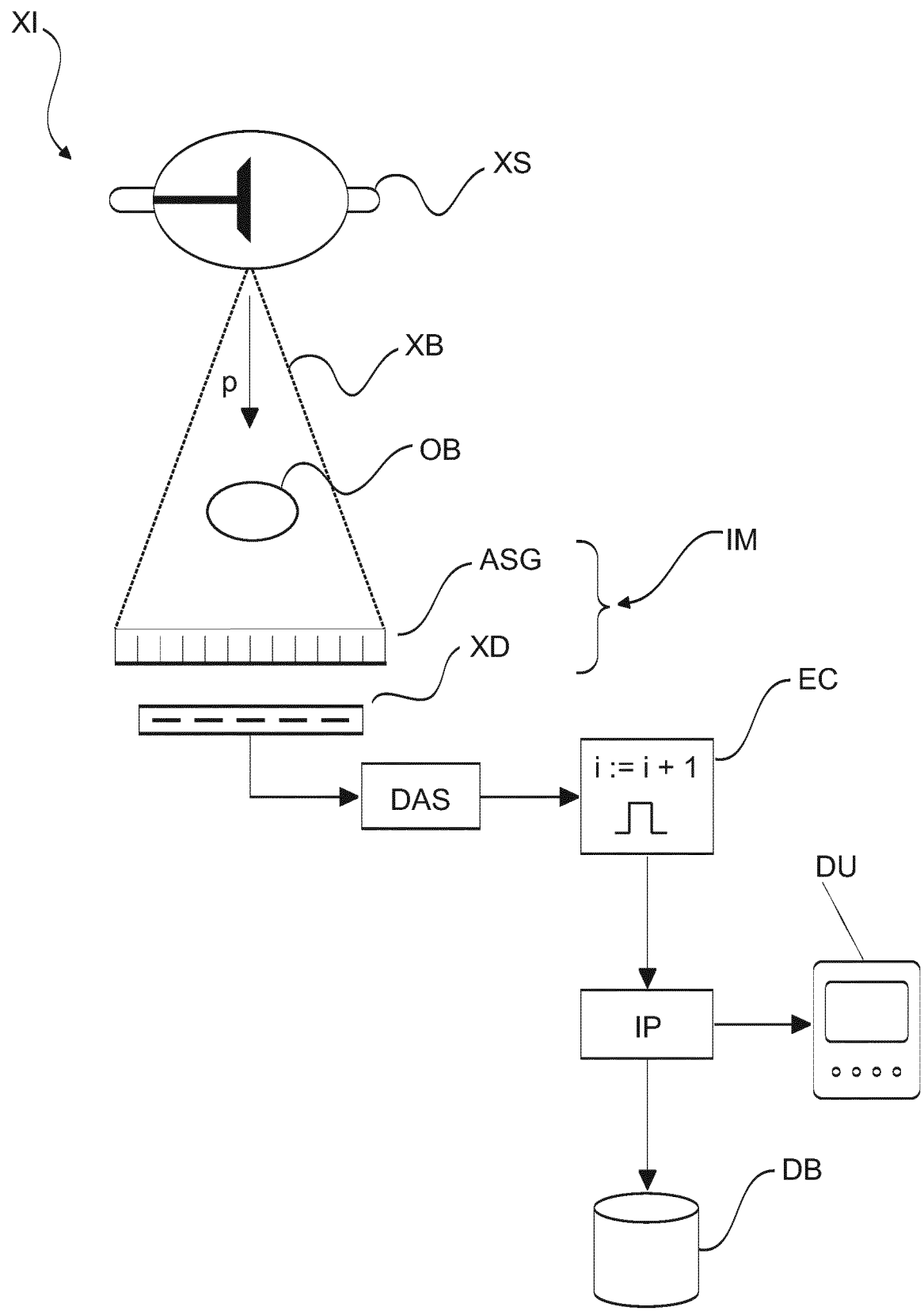
FIG. 1 shows a schematic block diagram of an X-ray imaging apparatus.

With reference to FIG. 1, there is shown a schematic block diagram of an X-ray imaging apparatus XI (also referred to herein as "imager").

The X-ray imaging apparatus XI includes an X-ray source XS. The detector envisaged is preferably digital, in particular of the flat panel type, but other variants, such as curved ones that are focused on a focal spot of the X-ray source XS, are also envisaged herein. At a distance from the X-ray source XS, across an examination region, there is arranged an imaging module IM including an X-ray sensitive detector XD. The imager is configured to acquire imagery, in particular in relation to an internal structure and/or material composition of the object OB.

The object OB may be animate or inanimate. In particular, the object is a human or animal patient or a part thereof. The X-ray imager XI is particularly envisaged for, preferably, spectral imaging in the medical field but other applications in non-medical fields are not excluded herein, such as baggage scanning or non-destructive material testing, etc.

During imaging, an object OB to be imaged resides in the examination region between the X-ray source XS and the X-ray detector XD. The X-ray source XS is energized by a user through a control unit (not shown). The X-ray source XS then emits x-radiation in the form of an X-ray beam XB that traverses the examination region and the object to be imaged. The X-ray beam is made up from photons of different energy defined by the spectrum of the x-radiation generated by the X-ray source XS.

The photons interact with matter in the object OB. Some of the photons are absorbed by the matter whereas other photons emerge at the far side of the object (as viewed from the X-ray source), and then interact with the X-ray sensitive detector XD. Some of the photons that emerge at the far side of the object OB have been scattered because of their interaction with the matter in the object OB whilst other photons emerge unscattered.

Detection by the detector of the scattered photons may mar image quality. The X-ray imager XI therefore includes an additional component, called an anti-scatter grid ASG, that is part of the image module IM. The anti-scatter grid ASG is arranged between the Object OB to be imaged and the detector XD. Preferably the anti-scatter grid ASG is mounted on top of the detector XD (again then, when viewed from the X-ray source). The anti-scatter grid essentially acts as a filter to filter out, by absorption, scattered photons that come from the object. The scattered photons are thus largely prevented from reaching the detector XD. The scattered photons are hence largely undetected by the detector thanks to the presence of the ASG. As a consequence, it is mainly the unscattered photons that make it through the anti-scatter grid ASG and are then actually detected by the detector XD. The unscattered photons are of main interest for imaging.

The X-ray imager XI as mainly envisaged herein is capable of event counting to quantify the manner in which the photons interact with the detector XD. In one particular embodiment the X-ray imager is a spectral imager that allows spectral analysis of the detected x-radiation/photons. This capability allows for instance a material decomposition of the object. That is, the detected radiation can be analyzed to identify different types of material tissue in the object for instance.

The anti-scatter grid ASG as proposed herein is of a novel type as it serves a dual function as will be explained in more detail with FIG. 2, but briefly, the newly proposed anti-scatter grid ASG reduces and eliminates scattered photons and, in addition, improves the photon counting capability of the imager XI because if allows to better differentiate signals caused by the photon. This will be explained in more detail below.

The photons that interact with the X-ray detector XD cause electrical signals which are picked up and processed by a digital acquisition system DAS. Conditioning circuitry in the DAS, such as pulse shaper, forms these signals into electric pulses which are then passed on to an event counter EC, such as a pulse counter. The event counter EC may be integrated into the imaging module or may be integrated in other components of the imager XI. In the pulse counter EC, the pulses are quantized or digitized against a set of thresholds. In other words, a height of a given pulse is compared against one, preferably more thresholds, and each time the pulse height exceeds a certain one of the thresholds, a counter is set for this threshold and pulse. In this manner, the electrical signals picked up at the detector XD are converted into a histogram data structure that represents the energy spectrum of the detected photons. In other words, the histogram data structure allows determining the amount of the detected photons that have energy in a certain energy interval ("bin"). The energy bins correspond to the thresholds in the event counter EC.

The so quantized event count data produced at the event counter EC forms raw count data which can be stored in memory or processed by an image processor IP into imagery. The imagery may be stored for later reference in an image storage DB or may be rendered for view on the display unit DU. For instance, the raw data may be processed into spectral imagery where portions of the image correspond to different types of materials that constitute the internals of the imaged object OB.

Figure 2:
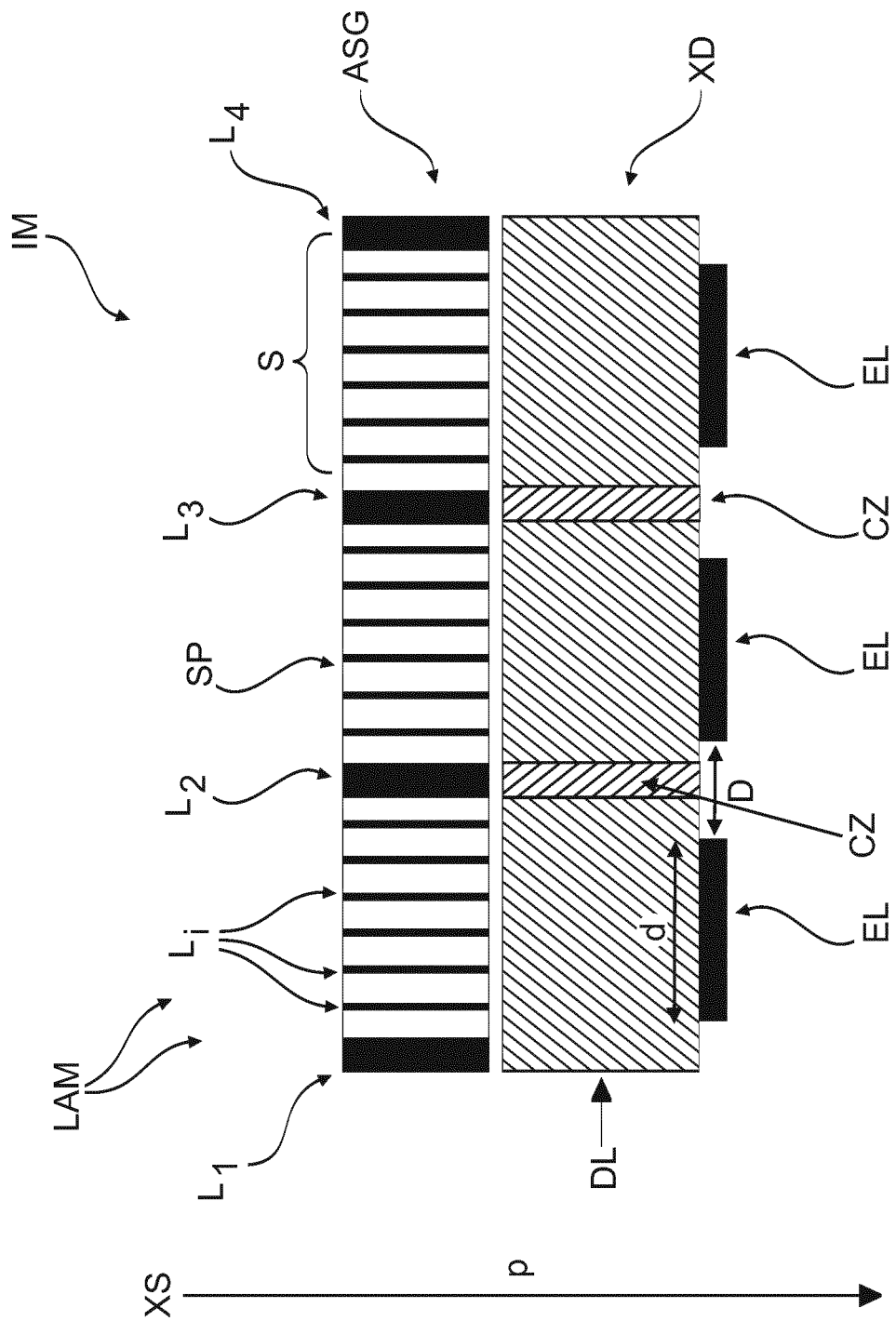
FIG. 2 shows a cross-sectional view of an imaging module including an anti-scatter grid.

Turning now to FIG. 2, this shows a sectional view through the imaging module IM, the section plane being parallel to the main propagation direction p of the x-radiation (see FIG. 1). Before explaining the newly proposed anti-scatter grid ASG in more detail, in may be of benefit to first turn in more detail to the signal formation process in the X-ray detector XD. The detector XD is preferably of the direct convertor type. More particularly, the detector XD includes a direct conversion layer DL formed from a suitable semi-conductor. The semiconductors have a crystalline structure, such as Silicon, CdTe, CZT, GaAs and Ge, and others. Just like the whole of the detector XD, the conversion layer DL is generally of a rectangular shape. In the view of FIG. 2, its other length dimension extends into the paper plane of the Figure. It is in and through this layer DL, that the impacting photons generate the electrical signals. Specifically, the conversion layer is sandwiched between pairs of electrodes EL. Only the anodes are shown in the sectional view of FIG. 2, arranged at the distal face of the conversion layer DL. The electrodes EL are spaced discretely apart at a distance D ("inter-electrode distance) and in a pattern on the distal surface of the direct conversion layer DL. Each electrode EL has a size d. The electrodes EL define a "pixelation" of the otherwise unstructured conversion layer DL. Each electrode EL corresponds to one detector pixel. The electrodes EL are sometimes referred to herein as "pixels". A voltage is applied across the electrodes and the direct conversion layer DL. Typically, the cathode is not pixelated to apply the same voltage across the layer DL. On the proximal face of the detection layer DL, the anti-scatter grid ASG is mounted.

X-ray photons that pass through the ASG (that is, the non-scattered photons) impact with crystals in the detector layer DL. Depending on the photon's energy, a number of electrons and holes are released that are otherwise bound in the crystal. The so released electrons and holes may themselves release further electrons and holes. Due to the applied voltage, a main part of the electrons and the holes cannot recombine and form two respective charge clouds. Driven by the applied voltage, the electron charge cloud defuses (downwardly) towards the anodes EL to cause the earlier mentioned electrical signals. The electrical signals are then formed into pulses for the charge clouds and are then processed by the event counter EC as previously described to produce the imagery.

Now, much of the event counting capability of the imager rests on its ability to distinguish between charge clouds caused by different photons. So, ideally, each electrode pair EL would respond to a charge cloud of a single photon at a time. Unfortunately, this is not always happening because of a non-negligible finite size of the chare clouds. In case the charge cloud is generated between adjacent pixels EL, a fraction of the cloud can be directed by the E-field to one of said pixels and another faction is directed to another pixels. This fact gives rise to the definition of so called critical zones shown as hatched sections in the cross sectional view of FIG. 2. These critical zones are volume sections inside the conversion layer DL between the electrodes EL. If a photon impacts the direct conversion layer DL in said critical zones CZ, the ensuing cloud charge may be registered by two or more, in particular adjacent, electrodes at both side of the respective critical zone CZ. This undesirable effect is called "charge sharing". In other words, the cloud charge induced by a photon through interaction with the direct conversion layer in the critical zones is shared between two or more anodes. This charge sharing may cause double or multiple counting for a single given photon because the charge is shared among two or more of the pixels that are defined by the anodes. Charge sharing may therefore disturb the energy discrimination capability of the imager.

Figure 3:
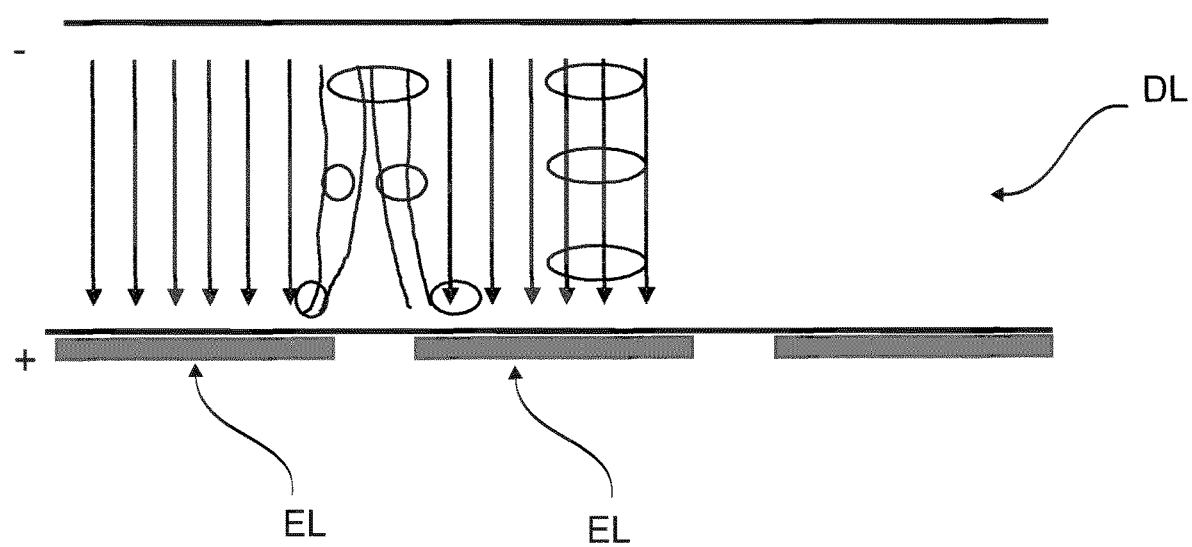
FIG. 3 shows a cross-section view through a conversion layer of a detector to illustrate charge sharing.

Charge clouds are illustrated as ellipses in the sectional view as per FIG. 3. The electrical field generated by the electrodes cause the electrons to travel along trajectories shown as lines in FIG. 3. The field lines are curved in the region between the adjacent electrodes which causes curved and diverging trajectories. A charge cloud can be described by an average diameter. It can be seen, that the larger the charge cloud, to more likely a charge sharing event is as the electrons in the charge cloud spilt up and are drawn towards on or the other electrode. The width of the critical zone is hence a function of the average charge cloud diameter ("ACD"). The ACD is a quantity than can be determined experimentally, given the type of conversion layer and X-ray spectrum generated by the X-ray source XS.

The anti-scatter grids arranged on top of the direct conversion layer DL is configured to reduce or even eliminate such multiple counting of the same event. Specifically, and turning now in more detail to the anti-scatter grid ASG, this has a grid structure which is also shown in the cross section in FIG. 2. A plurality of strips (or lamellae) LAM is arranged side by side with spacers SP to form a surface S that faces the incoming radiation/photons.

Each of the strips LAM are formed from a highly packed radiation material such as molybdenum, tungsten, lead or other or an alloy of any of these metals. The elongated strips have a length which in FIG. 2 extends into the paper plane. Each strip as a thickness along or parallel to the surface S, and, a "height" which extends outside the surface S and across thereto. Typical heights are between 1-4 mm and a typical thickness is about 5-50 µm, but other dimensions are not excluded herein. In the particular embodiment shown, the heights of the strips extend perpendicular to that surface (so along the main propagation direction of the incoming X-ray beam XB shown asp in FIG. 1). In this embodiment, the strips are all parallel and their thickness is perpendicular to the main propagation direction p. In one embodiment, an as shown in FIG. 2, the surface S of the strips LAM is planar but this not necessary so in all embodiments where the ASG surface S is curved around a point located at the focal spot of source XS. In this manner, focused ASGs may be formed to achieve a higher illumination of the detector. In other embodiment for focused ASG, the strips LAM are still arranged in a planar surface S as in FIG. 2, but some of the strips LAM are individually rotated or angled around their respective longitudinal axis. The further the strips are situated away from the middle portion of the surface S, the higher the rotation angles are, with no rotation at the center strip.

As proposed herein the grid includes two types of strips called guard strips $L_j$ of which three, $L_1$-$L_3$ are shown, and the remaining scatter strips $l_1$-$l_6$. The two types of strips are arranged in alternation to form the surface S. The guard strips, referred to generically as "$L_i$", are thicker than the scatter strips "$l_i$" (to use a similar, generic notation). In the particular embodiment of FIG. 2, the scatter strips $l_i$ are arranged in "runs" or groups of six. In between any two adjacent runs of scatter strips, there is arranged a respective guard strip $L_i$. However, this "≥–1" sequential layout is only exemplary and other layouts (more generally denoted as "1–N–1", N≥1) are also envisaged herein.

The two types of strips and their spatial arrangement implement the previously mentioned double function. The scatter strips $l_i$ (and that for matter the guard strips $L_i$) are arranged at a suitable aspect ratio to block scattered photons to so reduce the amount of scatter radiation that reaches the detector layer DL. The aspect ratio is an ASG specification and is the ratio between strip height and a distance between two consecutive strips. The aspect ratio defines the acceptance angle and hence the proportion of photons that are allowed to pass the ASG. The aspect ratio may be a function of the mean energy of the X-radiation/photon emitted from the X-ray source XS.

In addition to this function, the thicker guard strips L are arranged to reduce charge sharing and thus the likelihood of multiple counts for a single photon interaction event. Specifically, the charge sharing reduction capability of the guard strips Lj comes about because their thickness corresponds to the width D of the critical zones CZ.

It is proposed herein to dimension the thickness the guard strips in proportion to the ACD. In particular, the guard strip thickness is about the size of the ACD. The ACD may be less than the inter-electrode distance D or it may be about equal. Consequently, the guard strip is less or equal D. If the ACD is larger than D, the thickness may be chosen accordingly although it is envisaged herein to "clip" the guard strip thickness at about D or about 1.5×D to avoid undue degradation of the DQE. A DQE of about 80% should be considered although there may be good reasons to drop this restriction in some cases.

The guard strips $L_j$ are so aligned that, when viewed in plan view from the X-ray source XS, the guard strips are situated on top of the critical zones CZ in between any two adjacent electrodes EL. Due to their tuned thickness and their positioning in between the electrodes (in plan view) the guard strips $L_j$ essentially prevent incoming photons from reaching the critical zones CZ in the direct conversion layer. The formation of charge clouds that may cause multiple counts events can thus be prevented.

As also shown in the cross-sectional figure of FIG. 2, in between any two strips scatter strip $l_i$ or guard strip $L_j$, there is arranged a respective spacer SP strip formed from a suitable, radiation-translucent filler material. Suitable filler materials include cellulose such as paper, plastics or glues. Alternatively, the whole of the strips LAM are embedded, partly or completely, in a filler matrix or filler material package.

The spacers SP add integrity and stability by making the ASG resistant to shearing or other deformation and define the inter-spaces d between the strips to form "channels" to allow the non-scattered photons pass. The size and shape of the ASG usually comports to the shape and size of the X-ray detector XD on which the ASG is to be permanently or releasable mounted. In the embodiment where the detector XD is of the flat panel type, the ASG is then of equal, rectangular shape to match the shape and size of the radiation receiving face of the X-ray detector XD.

It will also be appreciated that the thickness of the guard strips is a function of the ACD and hence the width of the critical zones CZ which are to be covered by the guard strips. In particular, some or all of the guard strips $L_j$ may be substantially as thick as the critical zones are wide. Alternatively, some or all of the guard strips $L_j$ may be slightly thicker than the critical zone width.

The above described sequential pattern of "1–N–1", the number of scatter strips $l_i$ in each block, depends on the size d of the electrodes. In other words, whilst the thickness of the guard strips corresponds to the width of the critical zone CZ/ACD, the number of scatter strips that are arranged in a run correspond to the size of the anode EL. In other words, the block of contiguous strips $l_i$ may be substantially as long as the pixel is wide or slightly longer. As to the positioning of the guard strip $L_j$, once the ACD is known, the center line of the guard strips should preferably coincide with the center line through the inter-electrode distance D, with the guard strip extending either side of the center lines by ACD/2.

If the size of the pixel anodes EL differ, so will the number of scatter strips $l_i$ and if the width of the critical zones differs throughout the layer DL, so will the thickness of the guard strip $L_j$. Preferably however, the guard strips $L_j$ have the same thickness and there are the same number of scatter strips $l_i$ used in each run. The guard strips may be 4 or 5 times thicker than the scatter strips.

The ASG is mainly envisaged to form a one dimensional ("1D") grid as shown in FIG. 2. In other words, all strips LAM are essentially parallel with no strip running in a direction across. However, in the alternative, two-dimensional ("2D") grids are also envisaged herein where the inter-strip spaces filled by the spacer material SP form a checker-board pattern. In other words, this type of ASG consists of two sets of strips each forming a 1D grid as in FIG. 2, with the two sets crossing each other at 90°. In one embodiment, such as 2D grid can be built from two 1D grids as per FIG. 2. The two 1D grids are arranged on top of each other at 90° to form a layered structure, the desired 2D ASG.

The ASG may be arranged with a 1D strip pattern. Alternatively, the ASG may instead have a 2D strip pattern where the strips are arranged in two sets of directions perpendicular to each other. In the 1D variant, charge sharing can be reduced in one direction only (namely in the direction across the strips). In a 2D ASG, charge sharing can be reduced in two directions perpendicular to each other.

In one embodiment, the pixel size is about d=s=500 μm. An exemplary width D of the critical zone is about 40 μm. Correspondingly, the thickness of the guard strips is equally about 40 μm.

In addition, the number of scatter strips per pixel is about N=6, with the scatter strips being each about t=10 μm thick.

The spacer thickness is a function of (s,c,N,t) given a required DQE (detective quantum efficiency). The profile-height in turn is a function of the spacer thickness and aspect ratio.

For instance, with an exemplary geometrical DQE of 80% [=(s−c−N*t)/s], this then requires a spacer thickness of about x=57 μm=(s−c−N*t(N+1).

If an aspect ratio of r=25 is desired, the height becomes ~1.4 mm=x*r.

Typical pixel sizes envisaged herein are between 50 μm and 1 mm. Typical foil thickness of strips (0 are between 5 μm to 50 μm whilst foil thicknesses of the guard strips ($L_i$) are about 20 μm to 200 μm. Although these or similar specifications are envisaged in some exemplary embodiments, this is not to exclude other specifications that vary from those above.

One method of manufacture of the above described ASG of the 1D type as envisaged herein is to form the strips from metallic foil. The foils may be readily cold rolled into the desired thickness and suitably sized by slitting and trimming. Pack rolling may be done to increase throughput. Alternatively, if sheets of only a single thickness are available, the thicker metal foil may be formed by gluing or otherwise affixing multiple layers of the available foil sheet. For instance, the foil for the guard strip may be formed from multiple layer of the thinner, foil for the scatter strips. Using foils for forming the strips has been found to be low-cost.

The sheets of foil of greater thicknesses for the guard strips and the other, thinner sheets of foil for the scatter strips, are arranged one on top of each other in a stack, with any two sheets of foil having a layer of spacer material SP interposed in between. The thicker and thinner foil sheets are arranged in suitable alteration to achieve the desired sequential pattern 1–N-1, with N (≥1) thin foils arranged in respective sub-stacks, with a thick foil for the guard strip arranged in between any two such sub-stacks. In this manner a layered sandwich structure is formed from thin metallic foil, thicker metallic foil and spacer material layer, in alteration according to the sequential pattern. The spacer material layers are glued or otherwise affixed between the two neighboring layers of metallic foil $L_j$, $l_i$. Once the total number of sheets have been stacked (this will depend to the desired size of the ASG and field of view of the detector XD), the whole layered stack of metallic foil and spacer material is then left to cure if glue is used. Once the stack has stabilized, slices are cut through the stack. The section plane is perpendicular to faces of the foil sheets in the stack. Each slice then corresponds to an ASG as envisaged herein, with each such stack yielding a plurality of ASGs. A stabilizing frame may be run around the edges of the ASG structures so formed.

It will be appreciated that the metallic material for the foils used for the scatter strips and the guard strips, respectively, may not be the same. For instance, more expensive or higher density or radiation opacity material may be used for the guard strips $L_j$ as opposed to cheaper or less dense, less radiation-opaque material for the scatter strips $l_i$. Alternatively, the same foil is used in different thickness for scatter strips $l_i$ and guard strips $L_j$.

If a 2D variant of the ASG is required, two such 1D ASG may be placed and affixed on top of other, with one of the rotated by 90° relative to each other. In this embodiment, the 2D ASG variant has twice the profile-height of the 1D ASG.

Although the detector XD as described above is of the direct conversion type, indirect type converters which use an additional layer, a scintillator, are also envisaged herein in the alternative. For the type of indirect conversion detectors envisaged herein, the scintillator layer comprises a plurality of comparably small, active light guides or "pipes". For instance, Caesium Iodide (CsI) is grown in columnar 'needle-like' structures. Each column of CsI acts as a light pipe directing the visible light photons received from the scintillator to a light detector (e.g., a photo diode). In case the columns are supported on a protective layer (e.g., a glass substrate) between the CsI and the light detectors, the light can be shared between adjacent pixels as the light photons will have a certain spread when emanating from the scintillator layer. The spread may be geometrically described by a cone with a certain apex angle. This photon-based effect is comparable to the effect of charge sharing in detectors using direct conversion materials as explained above.

Figure 4:
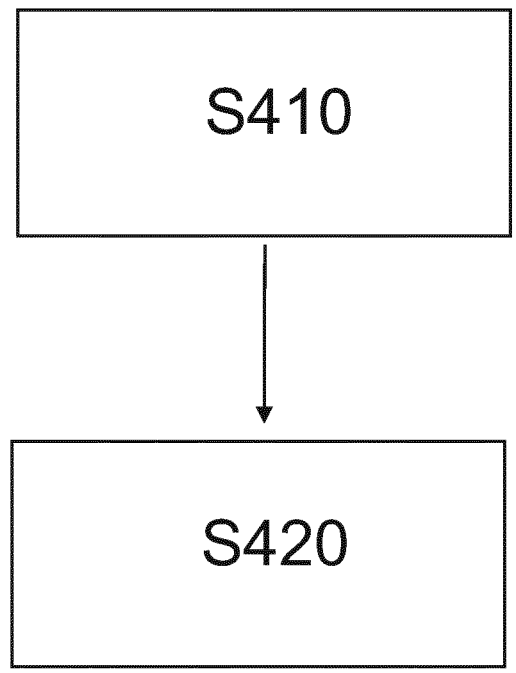
FIG. 4 shows a flow chart of a method to support manufacture of an anti-scatter grid.

Reference is now made to the flow chart of FIG. 4, where a method to support manufacture of an anti-scatter grid ASG as described above is shown.

At step S410 an average charge cloud diameter is determined for a given conversion layer DL type. This can be done experimentally by scanning a pencil X-radiation beam over the detector. An aperture mask or collimator may be used to realize the pencil beam. For each position of the beam at a given pixel, the responses of neighboring pixels are determined. With distance from the beam, the measured number of counts per time unit will drop under a given threshold (e.g. to zero). If this happens, the distance will provide a good approximation for the ACD. The procedure is repeated at different sample locations throughout the detector layer. The ACD values so gotten may then be averaged to obtain the ACD.

Based on the ACD so determined, the thickness of the guard strip (Li) is specified at step S420 and this can be used to prepare a foil of suitable thickness and proceed to build the ASG, for instance according to the stack layering technique as described above.

If the detector is of the indirect conversion type, a similar measurement can be done. The "conversion layer" in this case is the scintillator layer that converts X-ray into light rather than the conversion layer DL discussed above which converts X-ray into charge. In this case, the quantity measured at step S420 is an average spread of light photons generated in the scintillator.

Instead of the above described, foil-layering method, alternatives such as sputtering or other layer depositing techniques are also envisaged in alternative embodiments.

It should be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An anti-scatter grid for a photon counting X-ray detector, comprising:
    a surface; and
    a plurality of strips forming the surface, the plurality of strips including at least two guard strips that are thicker in a direction parallel to the surface than one or more other strips of the plurality of strips, the one or more other strips located between the at least two guard strips,
    wherein, in the direction parallel to the surface, one guard strip of the at least two guard strips is overlapped with an inter-space between two adjacent detector pixels and is overlapped with a critical zone at the inter-space,
    the one guard strip of the least two guard strips has a thickness in the direction parallel to the surface, the thickness of the one guard strip corresponding to a size of the critical zone at the inter-space, and
    in the critical zone, a fraction of a cloud is directed by an E-field to one detector pixel of the two adjacent detector pixels and another fraction of the cloud is directed to the other detector pixel of the two adjacent detector pixels.

2. The anti-scatter grid according to claim 1, wherein the at least two guard strips or the at least one or more other strips are formed from a foil.

3. The anti-scatter grid according to claim 2, wherein the foil is metallic.

4. The anti-scatter grid according to claim 3, wherein the foil includes at least one of Molybdenum, Lead, and Tungsten.

5. The anti-scatter grid according to claim 1, comprising an aspect ratio of 10 to 40.

6. The anti-scatter grid according to claim 1, wherein the thickness of the guard strip is between 20 μm and 200 μm.

7. The anti-scatter grid according to claim 1, wherein a thickness of at least one of the one or more other strips is between 5 μm and 50 μm.

8. The anti-scatter grid according to claim 1, wherein a distance between the at least two guard strips corresponds to a size of an average charge cloud diameter or an average spread of light photons formed in the X-ray detector.

9. An imaging apparatus, comprising:
a photon-counting X-ray detector having at least one detector pixel, the at least one detector pixel including two adjacent detector pixels; and
an anti-scatter grid comprising:
a surface; and
a plurality of strips forming the surface, the plurality of strips including at least two guard strips that are thicker in a direction parallel to the surface than one or more other strips of the plurality of strips, the one or more other strips located between the at least two guard strips,
wherein, in the direction parallel to the surface, one guard strip of the at least two guard strips is overlapped with an inter-space between two adjacent detector pixels and is overlapped with a critical zone at the inter-space,
the one guard strip of the least two guard strips has a thickness in the direction parallel to the surface, the thickness of the one guard strip corresponding to a size of the critical zone at the inter-space, and
in the critical zone, a fraction of a cloud is directed by an E-field to one detector pixel of the two adjacent detector pixels and another fraction of the cloud is directed to the other detector pixel of the two adjacent detector pixels.

10. The imaging apparatus according to claim 9, wherein at least one of the at least two guard strips is positioned between the two adjacent detector pixels to reduce a likelihood for detection of same X-ray radiation event by both of the two detector pixels.

11. The imaging apparatus according to claim 9, wherein a size of the at least one detector pixel is between 50 μm and 1 mm.

12. The imaging apparatus according to claim 9, comprising at least one processor configured to perform as an event counter.

13. The imaging apparatus according to claim 12, wherein the event counter is configured to support spectral imaging.

14. The imaging apparatus according to claim 9, wherein the imaging apparatus is a computed tomography scanner.

15. A method of manufacturing an anti-scatter grid of a photon-counting X-ray detector, the scatter grid to include strips of two different thicknesses, the method comprising:
providing a surface;
providing a plurality of strips to form the surface, the plurality of strips including at least two guard strips that are thicker in a direction parallel to the surface than one or more other strips of the plurality of strips, the one or more other strips located between the at least two guard strips,
wherein, in the direction parallel to the surface, one guard strip of the at least two guard strips is overlapped with an inter-space between two adjacent detector pixels and is overlapped with a critical zone at the inter-space;
determining a size of the critical zone at the inter-space, wherein in the critical zone, a fraction of a cloud is directed by an E-field to one detector pixel of the two adjacent detector pixels and another fraction of the cloud is directed to the other detector pixel of the two adjacent detector pixels; and
based on the determined size, specifying a thickness of the one guard strip of the at least two guard strips.

* * * * *